Nov 1, 1949.            R. TURNER              2,486,509
            ERASABLE SURFACE AND COPY HOLDER
                     Filed April 6, 1946
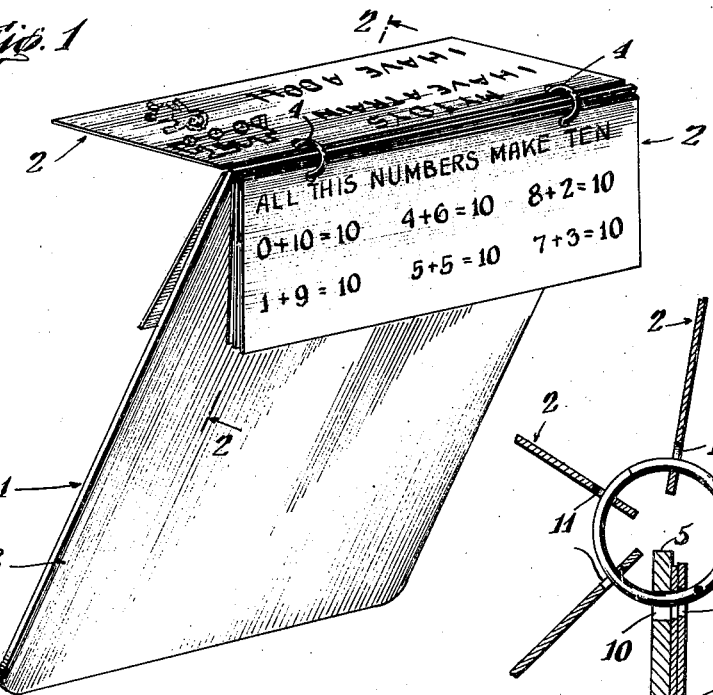
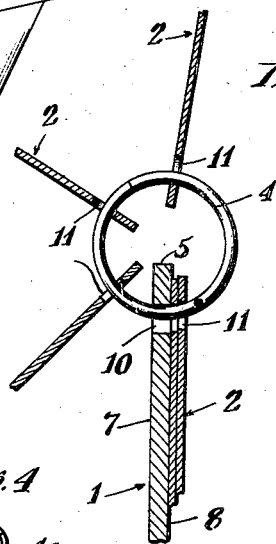
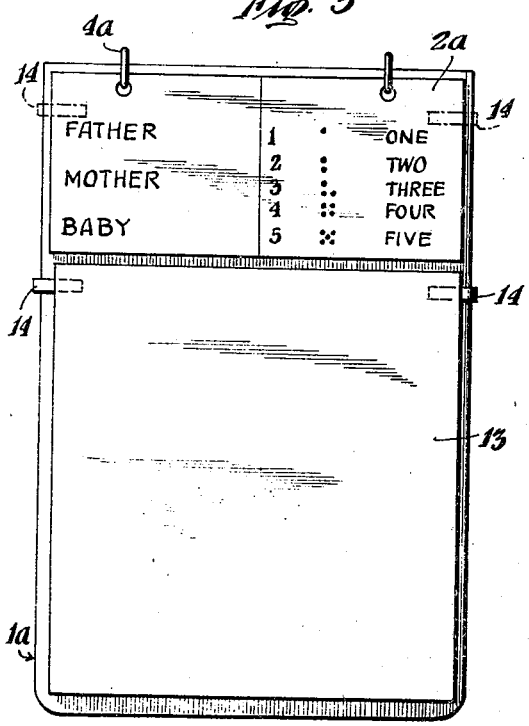
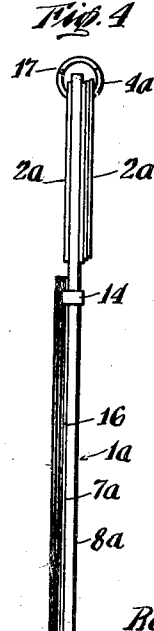
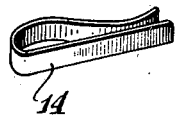
INVENTOR
Robert W. Turner
BY
Norman R. Holland
ATTORNEY Patented Nov. 1, 1949

2,486,509

UNITED STATES PATENT OFFICE 2,486,509

ERASABLE SURFACE AND COPYHOLDER

Robert Turner, Balwyn, Australia

Application April 6, 1946, Serial No. 660,112
In Australia May 15, 1944

2 Claims. (Cl. 35—62)

The present invention relates to an educational device and more particularly to an educational device of the blackboard type.

Many previous methods of instruction and devices have been developed in connection with instructing young children to write, count and draw. Some of these methods and devices have gone into commercial use but the majority of them have been discarded due to their being complicated and otherwise generally impracticable for use by young children.

An ideal instruction device is one which is attractive to a child, which embodies sufficient variety to hold the child's interest over a period of time, and one which the child can operate. The present invention aims to meet these desirable requirements by providing an educational device having the attractive feature of a writing surface in addition to educational features which teach a child characters such as numerals, letters of the alphabet, the simple outlines of various articles, et cetera. Thus a child may learn numbers, letters of the alphabet and other similar items while drawing or marking them on a writing surface. These features make the present device most desirable for use in kindergartens and other elementary classes for young children.

An object of the present invention is to provide a new and improved educational device.

Another object of the present invention is to provide an educational device adapted to teach children the appearances of numerals and of letters of the alphabet.

Another object of the invention is to provide an educational device which will hold a child's attention for a considerable period of time.

Another object of the invention is to provide an educational device which a child can operate with a minimum amount of forethought or judgment.

Still another object of the invention is to provide an educational device which combines a blackboard or other writing surface with an instructional device at all times.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

Fig. 1 is a perspective view illustrating a preferred embodiment of the present invention;

Fig. 2 is a fragmentary sectional view taken along the line 2—2 of Fig. 1;

Fig. 3 is a plan view illustrating a modified form of the invention;

Fig. 4 is a side view of the modified form illustrated in Fig. 3; and

Fig. 5 is a perspective view showing one form of a retaining device or clip illustrated in Figs. 3 and 4.

Referring again to the drawing and more particularly to Figs. 1 and 2 thereof there is shown an educational device comprising a relatively large central member or sheet of material 1 having a plurality of smaller sheets or cards 2 secured thereto by rings 4 adjacent its upper edge 5. The center sheet 1 is preferably made from some relatively light weight and sturdy material such as cardboard, fiber board or the like, with each side 7 and 8 of the central member preferably having a blackened or dark surface or other type of surface suitable for marking upon with chalk or crayon. Materials such as cardboard or fiber board possess the features of strength and toughness, are not readily breakable and do not shatter into sharp pieces when broken.

The cards or strips 3 shown secured by the rings 4 to the upper edge 5 of the central member 1 may be made of lighter weight cardboard or plastic material approximating for example, the thickness of an ordinary playing card and may be secured to the central member 1 by the rings 4 which extend through apertures 10 in the central member and apertures 11 in the cards or strips 2. The ring and aperture construction facilitates movement of the cards 2 freely from one side to the other of the central member or blackboard. It is desirable that the cards fit loosely to the rings 4 so that they may flip around the end of the central member or blackboard from one side to the other thereof when moved by a child or when the board is shaken or waved in the air. While five cards are shown secured to the central member in the figures it is to be understood that this number is merely for illustrative purposes and that any suitable number of cards may be utilized.

Preferably the cards 2 extend over only a part of the upper surface of the central member 1 so that an area below the cards remains unobstructed and may be written or drawn upon with chalk or crayon. The dimensions of the central member and the cards may be varied in accordance with the desires of a manufacturer and a particular user; satisfactory proportions are achieved with a central member having approximate dimensions of ten inches wide and fifteen inches long and with cards approximately four inches high and ten inches wide, thus leaving an uncovered or exposed writing surface or area approximately ten inches by eleven inches.

Each of the cards 2 secured to the central member is printed, inscribed with, has molded into it, or has otherwise affixed thereto, at each side thereof, suitable instructional material. This instructional material may take various forms; it may comprise letters of the alphabet, numerals, short sentences, simple line drawings, et cetera. In Fig. 1 one card is shown with instructional material at one side thereof and another card is shown with different instructional material at the opposite side thereof; each side of every card may, and preferably does, contain instructional material differing from the instructional material at any other side of another card. When any card is positioned at the left side 7 of the central member shown in Fig. 1 the instructional material may be copied or taught by using the writing surface located below the card at the left side of the central member or sheet 1; when a card is reversed from the left side 7 to the right side 8 of the central member 1, different instructional material appears in view and this material may be used as a guide for the markings made by a child on the right side of the sheet 1 below the card. At either side of the central member a card is adapted to lie flat against the surface of the central member or against lower cards.

In addition to having instructional material at opposite sides of the cards 2, it is desirable that each card be of a different color or different shade of color from the other cards so that in using the device a child may learn to differentiate colors without being conscious of receiving any systematized instruction.

In using the present invention, a particular card 2 may be turned into view, in which position it is adapted to lie flatly against a central member 1 or against lower cards adjacent the upper edge 5 of a central member to which the cards are secured. The instructional material is thus clearly in view adjacent the upper part of the central member and the lower part of the central member is free to receive writing, pictures or figures shown on or taught by a card 2. A child may use chalk, crayon or any other suitable marking implement in studying and copying the material shown on a card. The fact that the cards are freely and securely attached to the central member 1 is important in connection with retaining the attention of children of kindergarten or nursery school ages. Children in this age group quickly tire of a particular toy or of receiving instruction unless the toy or instruction can be varied so as to hold their attention. One of the first indications of fretfulness or petulance is when a child commences to shake or wave an article or toy in the air; when the present educational device is shaken the cards 2 flap around the end of the central member from one side to the other of it and call the child's attention back to the cards so that it will cease waving the device and commence to inspect the cards, at which time the possibility is that a different card has fallen into view. The different pictures, coloring, and markings on the new card again excite the interest of the child and occupy its attention for a further period of time. The instructional material on a card is always visible at either side of the device. A more precocious child may readily turn or reverse the various cards from one side to the other of the central member; the cards turn easily, are always operatively attached in place, and do not require any relatively complicated assembly or operating procedures.

In Figs. 3 and 4 there is shown a modified form of the invention wherein a plurality of sheets of paper or a pad 13 is shown retained to the central member 1 by spring clips 14 or other suitable holding means. The construction and its operation are generally similar to the preferred embodiment described hereinabove and the cards 2a may be reversed by positioning them at one side or other of the central member 1a.

While the clip members 14 are shown extending over the cardboard backing 16 of a pad to thus retain it in position against the central member 1a, it will be clear that the clips may extend over the upper or top sheet of a pad to hold the sheets of the entire pad against the central member 1a. The position shown in Figs. 3 and 4 wherein the clip extends over the pad backing 16 is preferred, however, as it facilitates tearing or removal of sheets from the pad as they are used. When a pad or sheets of paper are not utilized with the device the clips may be pressed over the central member 1a beneath the cards 2a as indicated by the dotted lines adjacent the upper part of the central member in Fig. 3.

Each of the securing rings 4a is shown provided with a hinge or pivot 17 to facilitate opening thereof and the substitution or addition of new cards, the rings being held closed by any suitable form of releasable interlocking end construction. Such new cards from time to time further contribute toward maintaining a child's interest. It will be understood that this feature may also be used with the preferred embodiment.

It will be seen that the present invention provides a new and improved educational device of the blackboard type which is adapted to attract and retain a child's attention over a considerable period of time. The construction may be operated by a child and does not require the assistance of an instructor to make available different cards for a child to copy or study. In the event that a child tires momentarily of the device and tries to shake it in the air the cards flap about the end of the writing surface and the noise and motion again attracts the child's attention; the different card which has come into view against the upper part of the device gives rise to freshened interest and the child is attracted to the device for a further period of time. A child may readily operate the construction since it does not require any complicated interfitting or assembling operations. The central member and the cards may be made from materials which are strong and tough and which are not readily breakable, thus the device is well able to withstand the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An educational device of the class described comprising a central member having erasable type writing surfaces at opposite sides thereof and having a plurality of spaced apertures adjacent an upper edge thereof, a plurality of cards of lesser area than said central member normally overlapping the upper part of said central member each carrying instructional material at opposite sides thereof and each having a plurality of spaced apertures adjacent a normally upper edge thereof, and attaching rings extending loosely through the apertures of said cards and central member and around the upper edges of the cards and central member loosely and reversibly holding said cards and facilitating positioning of the cards adjacent the writing surface at either side of the central member, said cards being readily flippable from one side to the other of said central member, whereby instructional material disposed at opposite sides of a card may be viewed at opposite sides of the central member in proximity to a writing surface.

2. A device of the class described comprising, a central member having erasable type writing surfaces at opposite sides thereof and having spaced apertures adjacent the upper edge thereof, a plurality of cards of lesser area than said central member normally overlapping the upper part of said central member having spaced apertures adjacent their upper edges in registry with the apertures of said central member and each provided with instructional material at opposite sides thereof, holding rings extending loosely through said apertures of the cards and the central member and around the upper edges of the cards and central member loosely and reversibly securing said cards to said central member and facilitating positioning of the cards adjacent the writing surface at either side of the central member, said cards being readily flippable around the upper edge of said central member to either side of the upper part of said central member above and in proximity to the writing surface of a pad of paper carried by the central member, a pad of paper carried by said central member, and means adapted to secure said pad to said central member at either side thereof with the upper edge of the pad in juxtaposition to a free lower edge of a card, whereby instructional material carried at either side of a card is adapted to be located close to said pad.

ROBERT TURNER.

REFERENCES CITED

The following references are of record in the file of this patent:

UNITED STATES PATENTS

| Number | Name | Date |
|---|---|---|
| 60,356 | French | Dec. 11, 1866 |
| 61,254 | Rhees | Jan. 15, 1867 |
| 672,087 | Williams et al. | Apr. 16, 1901 |
| 809,712 | Manuel | Jan. 9, 1906 |
| 855,965 | McPeek | June 4, 1907 |
| 1,111,004 | Butler | Sept. 22, 1914 |
| 1,280,930 | Wolfe | Oct. 8, 1918 |
| 1,428,456 | Stranders | Sept. 5, 1922 |
| 1,931,378 | Fancher | Oct. 17, 1933 |
| 2,234,075 | Carolin | Mar. 4, 1941 |